(12) United States Patent
Abrat et al.

(10) Patent No.: US 7,370,872 B2
(45) Date of Patent: May 13, 2008

(54) RIGID VEHICLE AXLE WITH INTEGRAL TRAILING ARMS

(75) Inventors: Dunja Abrat, Breuna (DE); Olaf Schütte, Kassel (DE)

(73) Assignee: Daimler AG, Stuttgart (DE)

( * ) Notice: Subject to any disclaimer, the term of this patent is extended or adjusted under 35 U.S.C. 154(b) by 435 days.

(21) Appl. No.: 11/032,507

(22) Filed: Jan. 10, 2005

(65) Prior Publication Data

US 2005/0156462 A1 Jul. 21, 2005

Related U.S. Application Data

(63) Continuation-in-part of application No. PCT/EP03/05684, filed on May 30, 2003.

(30) Foreign Application Priority Data

Jul. 11, 2002 (DE) .............................. 102 31 377

(51) Int. Cl.
*B60G 9/00* (2006.01)

(52) U.S. Cl. .................. 280/124.116; 280/124.157; 280/124.128; 301/127

(58) Field of Classification Search ......... 280/124.116, 280/124.128, 124.157, 124.125, 124.133, 280/269, 124.1; 301/127; 464/180
See application file for complete search history.

(56) References Cited

U.S. PATENT DOCUMENTS

| | | | | |
|---|---|---|---|---|
| 5,112,078 A | * | 5/1992 | Galazin et al. ....... | 280/124.116 |
| 5,308,171 A | * | 5/1994 | Sakamoto ................ | 384/448 |
| 5,366,237 A | * | 11/1994 | Dilling et al. ........ | 280/124.116 |
| 5,522,246 A | * | 6/1996 | Simon .......................... | 72/260 |
| 5,882,031 A | * | 3/1999 | VanDenberg ............... | 280/683 |
| 6,261,183 B1 | * | 7/2001 | Duggan et al. ............. | 464/134 |
| 6,425,593 B2 | * | 7/2002 | Fabris et al. ................ | 280/104 |
| 6,491,314 B2 | * | 12/2002 | Smith et al. .......... | 280/124.116 |
| 6,508,482 B2 | * | 1/2003 | Pierce et al. .......... | 280/124.116 |
| 6,616,157 B2 | * | 9/2003 | Christophliemke et al. .................... | 280/124.106 |
| 6,688,619 B2 | * | 2/2004 | Biard et al. ........... | 280/124.111 |
| 6,808,192 B1 | * | 10/2004 | Bol ..................... | 280/124.116 |
| 6,918,182 B2 | * | 7/2005 | Reineck ..................... | 29/897.2 |
| 6,966,839 B2 | * | 11/2005 | Tomonelli .................. | 464/180 |
| 7,007,960 B2 | * | 3/2006 | Chalin et al. ......... | 280/124.116 |
| 7,086,655 B2 | * | 8/2006 | Chan et al. ........... | 280/124.116 |
| 7,201,388 B2 | * | 4/2007 | Abrat et al. .......... | 280/124.128 |
| 2003/0067133 A1 | * | 4/2003 | Eveley .................. | 280/124.11 |
| 2005/0023788 A1 | * | 2/2005 | Svartz et al. .......... | 280/124.11 |
| 2005/0242541 A1 | * | 11/2005 | Griffiths ................ | 280/124.11 |

FOREIGN PATENT DOCUMENTS

DE 195 19 576 12/1996

(Continued)

*Primary Examiner*—Ruth Ilan
(74) *Attorney, Agent, or Firm*—Klaus J. Bach

(57) ABSTRACT

In a rigid vehicle axle comprising an axle beam with axle journals forming wheel carriers arranged at the ends thereof, and at least two trailing arms rigidly fixed to the axle beam, each half of the rigid vehicle axle comprises an axle beam section, a trailing arm section and a wheel head section arranged adjacent one after another and the ends of the axle tube sections overlap with the adjoining ends of the trailing arm sections and their end faces are congruent with the respectively adjoining end faces of the wheel head sections, at least in some areas, and the adjoining sections are welded together.

8 Claims, 4 Drawing Sheets

FOREIGN PATENT DOCUMENTS

| | | |
|---|---|---|
| DE | 296 16 257 | 12/1996 |
| DE | 19519576 A1 * | 12/1996 |
| DE | 100 60 312 | 1/2002 |
| GB | 582 997 | 12/1946 |
| WO | PCT WO 03/018334 A1 * | 8/2001 |

* cited by examiner

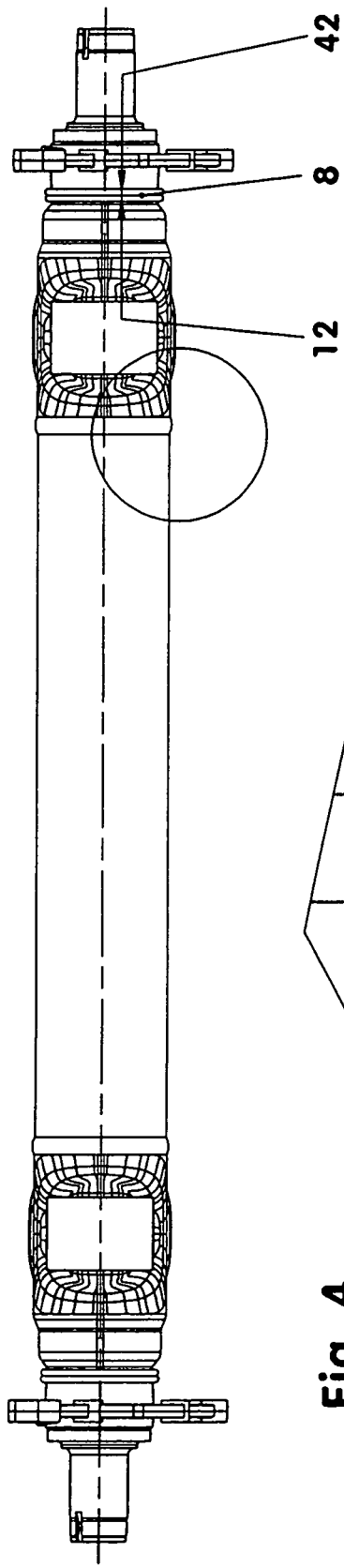
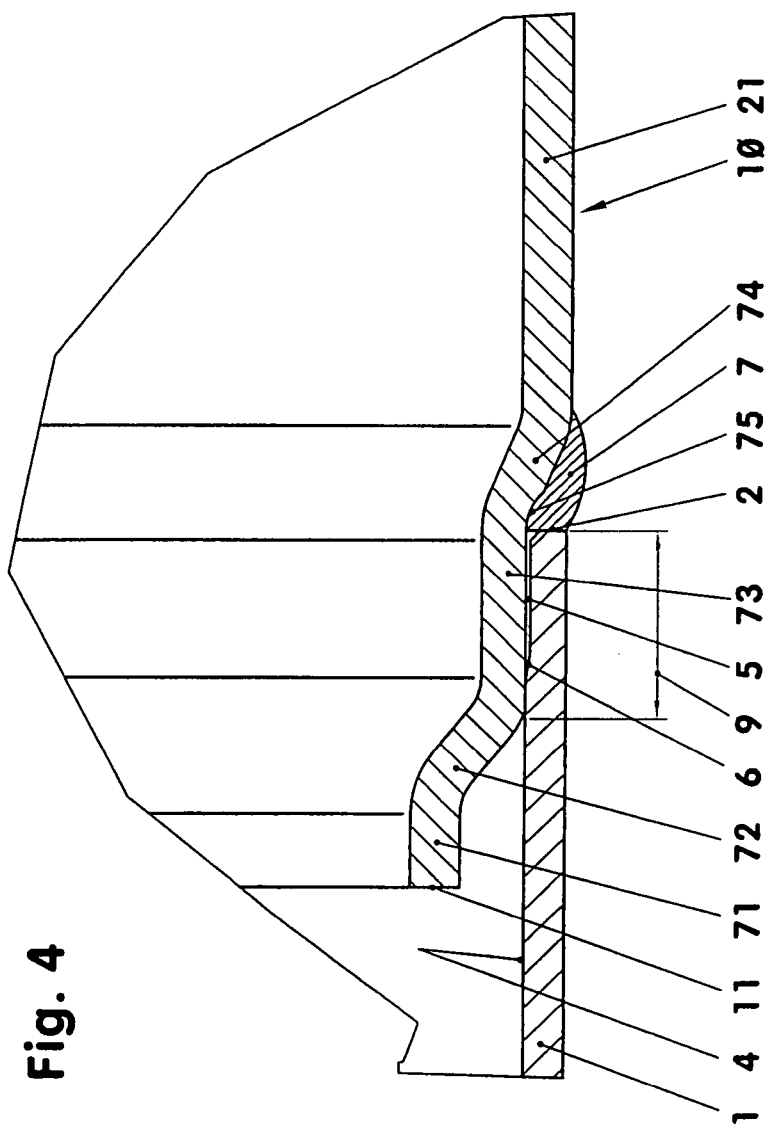

RIGID VEHICLE AXLE WITH INTEGRAL TRAILING ARMS

This is a Continuation-In-Part application of International Application PCT/EP2003/005684 filed May 30, 2003 and claiming the priority of German application 102 31 377.6 filed Jul. 11, 2002.

BACKGROUND OF THE INVENTION

The invention relates to a rigid vehicle axle comprising an axle beam with axle journals or wheel carriers arranged at the ends thereof, and at least two trailing arms rigidly fixed to the axle beam, each half of the vehicle rigid axle—as viewed from the center of the axle—comprising, arranged one after the other, an axle beam section, a trailing arm section and a wheel head section and the wheel head section comprising at least an axle journal or wheel carrier.

DE 296 16 257 U1 representing the generic type of such an axle discloses a pneumatically suspended rigid vehicle axle, which comprises an axle tube and trailing arms welded thereto. Trailing arms with corresponding socket holes are pushed on to the axle tube, which is in the form of an axle journal at each of its two ends. The trailing arms are welded to the axle tube along the socket holes. The trailing arm is extended rearwards beyond the axle tube, where its free end serves as support for an air spring. The said extension, among other things, makes the trailing arm a component subject to flexural stress. In order to reduce any weakening of the trailing arm due to the socket holes, the cross sectional profile of the trailing arm must be designed with relatively large dimensions. Moreover, in the area of the welds, the layers of material of the axle tube and the trailing arm are superimposed one on top of another in the radial direction of the axle tube. Such material doublings and stiffening measures have a detrimental effect on the size of the unsprung mass.

Furthermore, DE 100 60 312 A1 discloses an axle tube for a vehicle axle which, for stability and weight-reduction reasons, has a plurality of tubular sections of different diameter between the axle journals and stub axles. These individual axle sections are butt-joined together, for example by friction welding.

It is the object of the present invention to provide a rigid vehicle axle, which increases ride comfort and driving safety and reduces tire wear. At the same time, the construction of the axle should facilitate adaptation to different self-propelled and/or towed vehicles.

SUMMARY OF THE INVENTION

In a rigid vehicle axle comprising an axle beam with axle journals forming wheel carriers arranged at the ends thereof, and at least two trailing arms rigidly fixed to the axle beam, each half of the vehicle rigid axle comprises an axle beam section, a trailing arm section and a wheel head section arranged adjacent one after another and the ends of the axle tube sections overlap with the adjoining ends of the trailing arm sections and their end faces are congruent with the respectively adjoining end faces of the wheel head sections, at least in some areas and the adjoining sections are welded together.

The central wall thickness of the axle tube sections is less than the central wall thickness of the trailing arms. The axle tube sections are welded to the trailing arm sections, and the trailing arm sections are welded to the wheel head sections. The axle tube sections and trailing arm sections which are adjacent to one another are plugged into the other in a centering fashion in the regions of the welds, the lengths of the centering overlaps being less than five times the central wall thickness of the axle tube sections.

Such vehicle rigid axles are used, among other things, as trailer axles for heavy commercial vehicles. The parts: axle beam section, trailing arm section and wheel head section are assembled according to track width and admissible axle load and are in each case welded to one another at the corresponding ends. When assembling, it is possible in order to form an axle for a trailer, for example, the track width of which is greater than the standard track width, to use a longer trailing arm. Instead of the longer trailing arm, longer axle journals or wider trailing arm sections can be used, whilst leaving the frame width unchanged.

No, or only short, centering overlaps of the sections in the areas of the weld seams substantially avoid material doublings in the weld zone. In this way, inter alia, the axle weight is reduced without a loss of strength. In order to reduce the axle weight further, thinner wall thicknesses for the axle tube are selected than the wall thicknesses of the trailing arms which are subject to high loads. Since, at the same time, the axle tube sections generally have a larger average diameter than the hollow-profile regions of the trailing arm sections, these different axle assemblies are adapted to the load profile in an optimum way in terms of strength and rigidity.

The weight reduction reduces the unsprung axle mass, thereby, among other things, reducing the susceptibility of the rigid axle to bumping. This improves road adhesion and hence driving safety. It also has a positive effect on the life of the tires.

The invention will become more readily apparent from the following description of a particular embodiment of the invention described below with reference to the accompanying drawings:

BRIEF DESCRIPTION OF THE DRAWINGS

FIG. 4 is a front view of the rigid axle without fittings;
and
FIG. 5 shows a detail of the joint between axle tube section and trailing arm section.

DESCRIPTION OF A PREFERRED EMBODIMENT

Figure 1:
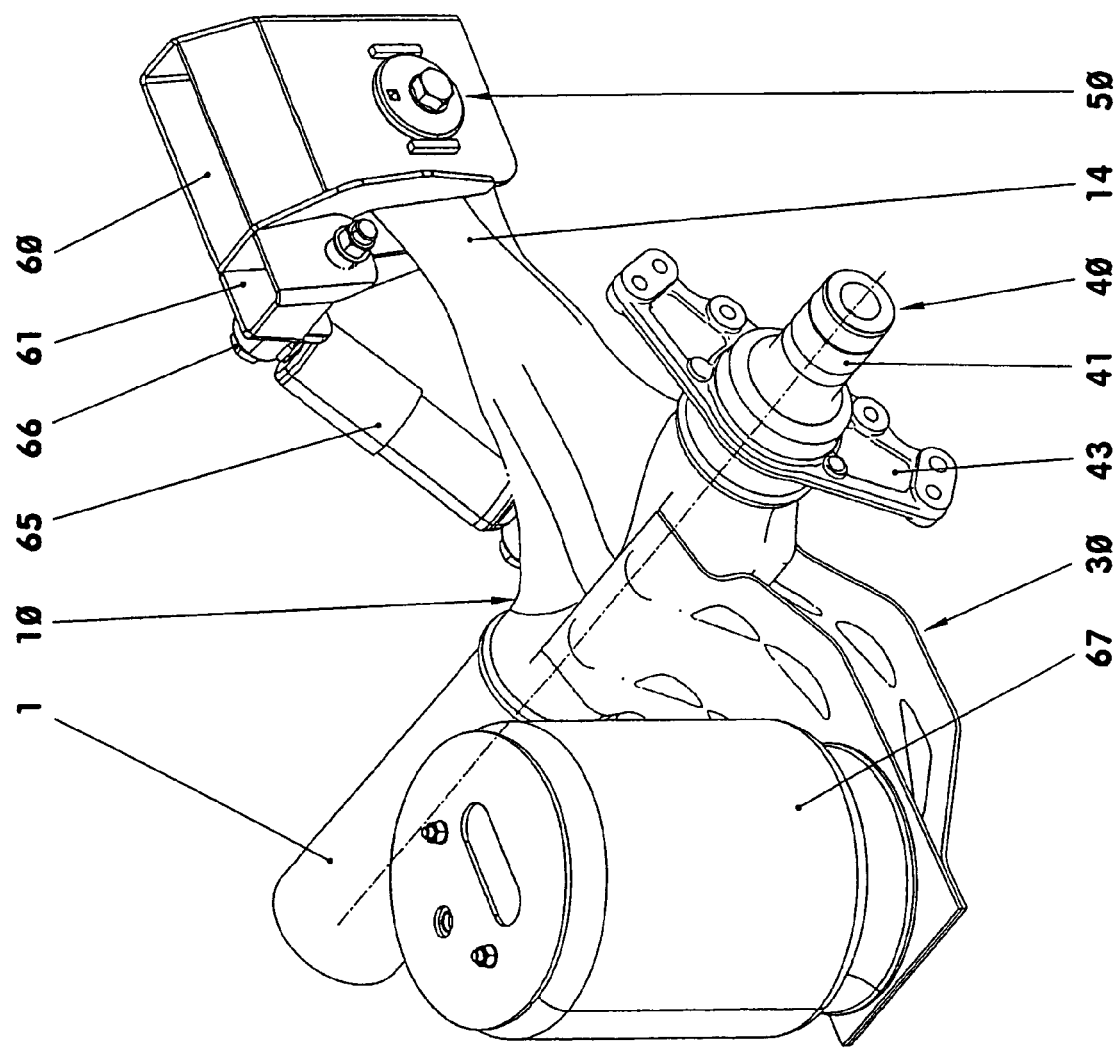
FIG. 1 shows an outer part of a rigid vehicle axle.
Figure 2:
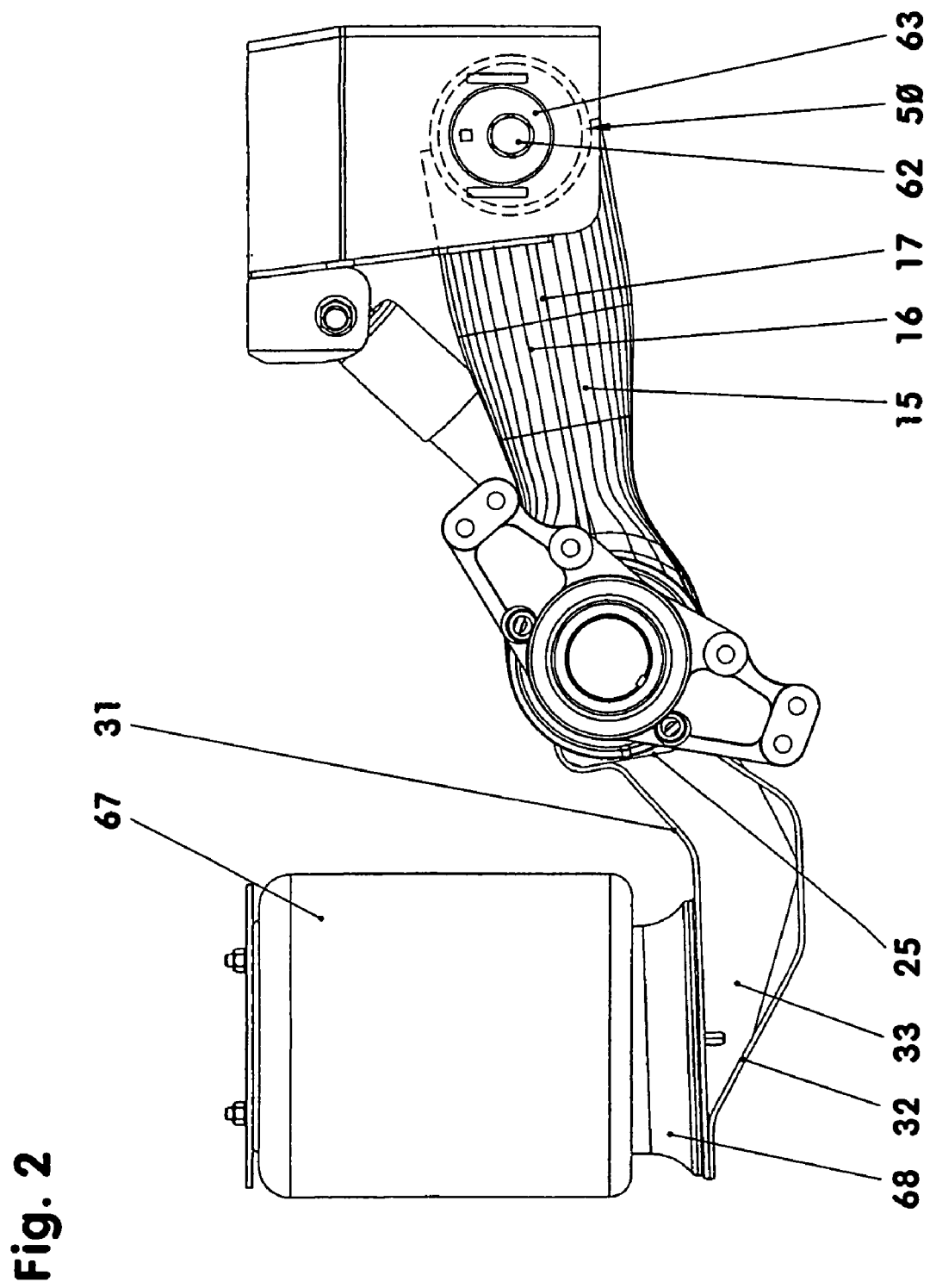
FIG. 2 is a side view of FIG. 1.
Figure 3:
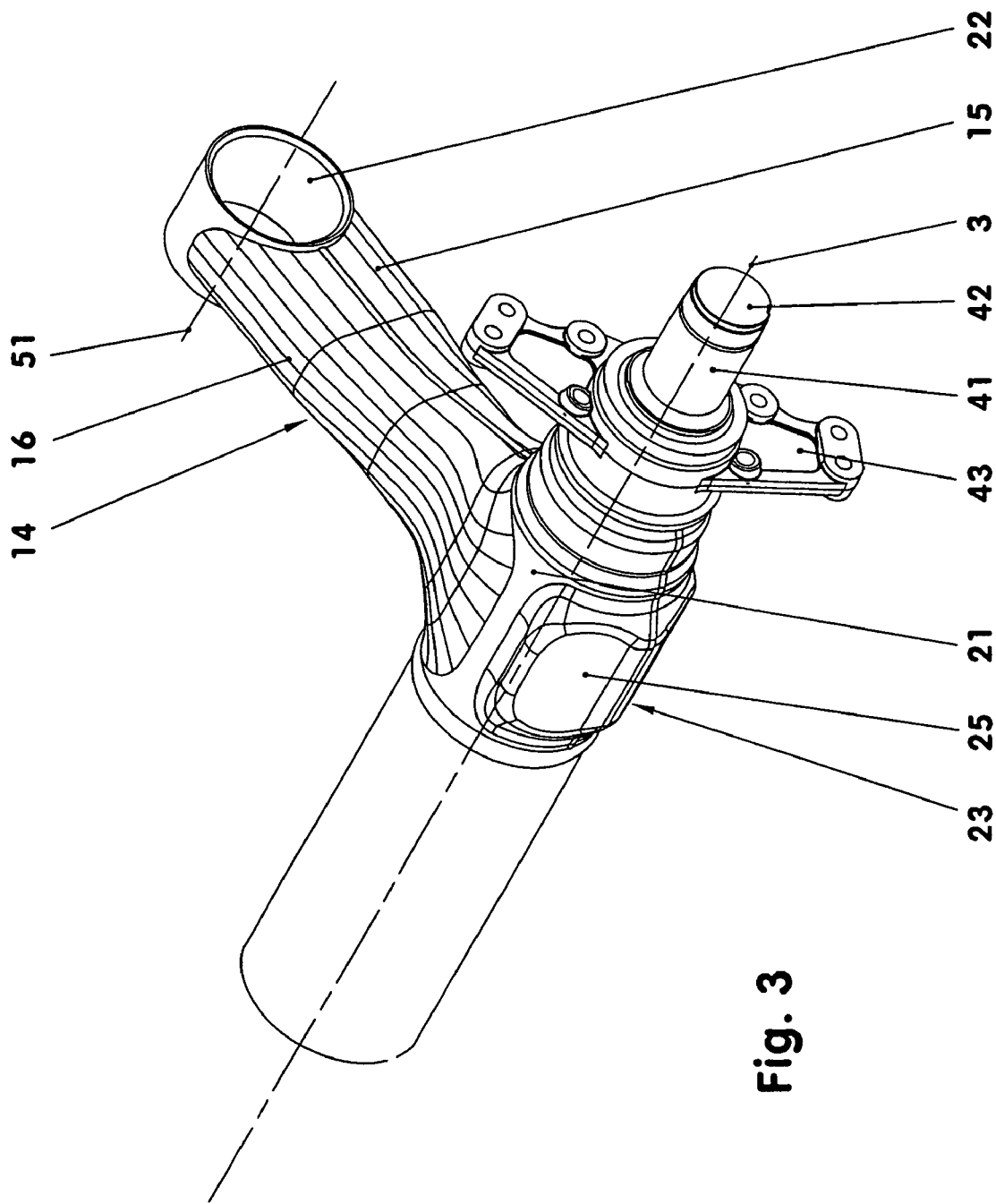
FIG. 3 shows part of the axle tube section with the trailing arm section in a perspective view.

FIGS. 1 to 3 show, by way of example, a right-hand outer area of an axle of a towed commercial vehicle trailer or semitrailer without wheel and brake.

According to FIG. 1 the axle part shown comprises an axle tube section 1, a right-hand trailing arm section 10 and a wheel head section 40. At its front end—pointing in the direction of travel, for example—the trailing arm section 10 is fixed by means of an elastomer body in a bearing bracket 60 supported on the vehicle body side, so that it can swivel universally in an articulated bearing 50. It is braced in relation to the bearing bracket 60 by means of a shock absorber 65. The rear end of the trailing arm section 10 is braced on the vehicle body (not shown) by way of an air spring 67.

The axle tube section 1 comprises, for example, a smooth, cylindrical axle tube. The axle tube section 1, which is a hollow round body may also have a polygonal profile. It terminates directly at the trailing arm section 10 with a straight, plane end face 2. The end face 2 is aligned perpendicular to the center line 3 of the axle tube 1. From the end face 2 and the inner wall 4, the wall thickness of the axle tube section 1 is reduced by less than one eighth of the wall thickness—in the form of a, for example, cylindrical recess 5. The depth of the recess 5 measured in the direction of the center line 3 is approximately three times the wall thickness of the axle tube section 1. The recess 5 ends in a chamfer 6 whose acute chamfer angle is less than 10°.

The trailing arm section 10 functionally comprises a central element 21, a suspension arm segment 14 with a joint eye 22 and a spring bracket 30. The central element 21 is of barrel-shaped design and has two, for example open end faces 11, 12, cf. FIGS. 4 and 5. The end which is to be inserted into the axle tube section 1 during assembly is stepped twice here ahead of the end face 11. In the view from this end, the first step is the insertion section 71, and the second step is the centering section 73. Both sections 71, 73 are, for example, of the shape of a cylindrical tube at least in certain areas. Between the central element main area which forms a support lug 23 and the centering section 73 there is a transition region 74 in the form of the outer surface of a truncated cone. Its acute cone angle is, for example, approximately 45° A transition region 72 with an outer surface in the form of a truncated cone is arranged between the centering section 73 and the insertion section 71. The transition region 72 has a cone angle of, for example, approximately 75° In the zone between the transition region 74 and the centering region 73 there is a radius notch 75. Its radius corresponds, for example, to the mean wall thickness of the central element 21 and adjoins the centering region 73 tangentially. The radius merges in a noncontinuous form with the contour of the transition region 74.

In order to carry out assembly, the trailing arm section 10, for example, is inserted into the axle tube section 1. In the process, the insertion section 73 slides into the axle tube section 1, accommodating the end face 2, until the transition region 72 comes to rest on the chamfer 6 in the recess 5. As a result of the generally finely machined recess, the trailing arm section may be inserted several centimetres into the axle tube section 1 without applying any substantial amount of force and while avoiding an off-centered position.

In order to bring about the final insertion depth, the trailing arm section is pressed into the axle tube such that the axle tube section is elastically expanded with a much smaller compression of the dimensionally rigid, stepped end of the central element 21. The centering section 73 slides onto the inner wall 4 of the axle tube section 1 while being guided through the transition region 72. For example, both parts 1, 10 are then positioned one against the other by means of a short transverse form fit.

The parts 1 and 10 which are in contact with one another in an overlapping joint are welded between the end face 2 and the outer wall of the transition region 74. The resulting convex fillet weld 7 with unequal limbs has its root in the region of the notch radius 75.

Adjoining the central element 21 towards the joint eye 22 is the suspension arm segment 14. Both parts 21, 14 comprise, for example, a lower shell 15 and an upper shell 16 formed from sheet steel. The two shells 15, 16 are, for example, of mirror symmetrical design and are welded together. The weld groove lies in a plane, for example, which is spanned by the axle tube center line 3 and the center line 51 of the articulated bearing 50, cf. connecting line 17 in FIG. 2.

The suspension arm segment 14 has a varying cross section, for example, over its entire length, along the connecting line 17. In the area of the central element 21 it has an at least approximately elliptical cross section, the large major axis of the ellipse lying parallel to the axle tube center line 3. In the area of the joint eye 22 the cross section is oval, the vertical extent being two to three times larger than the horizontal transverse extent. Between these outer areas, offset with respect to the central element 21, is an area, which has, for example, a virtually circular or four-sided polygonal cross section.

On the side remote from the suspension arm segment 14, the central element 21 has a so-called support lug 23, cf. FIG. 3. The support lug 23 consists, for example, of a stiffening element which is applied or molded onto the central element 21.

According to FIGS. 1 and 2, the spring bracket 30 is formed as curved I-beam. The I-beam comprises an upper, sheet metal flange 31 with a shallow lunate curve, largely subjected to tensile stress, a comparable lower sheet metal flange 32 more subjected to tensile stress, and at least one central web 33, which joins the two sheet metal flanges 31, 32 at least in sections. Both sheet metal flanges 31, 32 carry double-rowed stiffening beads, for example, in their longitudinal direction. Both sheet metal flanges 31, 32 bear on the support lug 23.

The curvature of the spring bracket 30 is selected so that the upper free end terminates with a plane face, on which the bellows-type air spring 67 rests by way of a roll piston 68. The plane face encloses an angle of approximately 10° with the connecting line 17, cf. FIG. 2.

The spring bracket 30 is fixed to the central element 21, for example by welding, screwing or in a comparable manner. Different types of spring brackets 30 can thus be easily connected to the suspension arm segment 14.

In the extension of the axle tube center line 3 an axle journal 41 is arranged next to the trailing arm section 10. The journal is essentially a rotationally symmetrical part for supporting the wheel, which towards the trailing arm section 10, has an end face 42 perpendicular to the center line 3. A brake bracket flange 43 is formed on the axle journal 41 in proximity to this end face 42.

The axle tube 1, the trailing arm sections 10 and the axle journals 41 are all aligned with one another. The axle journal 41 is butt-welded on to the outer end face 12. Friction welding, for example, is used between the parts 10 and 40 as welding method.

Alternatively, an overlapping joint with a fillet weld with unequal limbs is also conceivable between the parts 10 and 40. In this case, for example, the axle journal 41 is then drilled open in the seam region.

The trailing arm section 10 is supported in the bearing bracket 60 by means of an elastomer body (not shown). The latter is seated in, for example pressed into, the joint eye 22. The elastomer body is fixed in the bearing bracket 60 by means of a bolt 62. The bolt 62 bears on the bearing bracket 60 on both sides in eccentric discs 63 between lateral stops, for adjusting the track, for example.

On the bearing bracket 60, there is a rectangular solid-shaped projection 61 facing the axle. One of the two shock absorbers 65 is fitted between this projection 61 and a bolt 66 arranged in the root area of the suspension arm segment 14.

What is claimed is:

1. A rigid vehicle axle comprising an axle beam consisting of two halves with axle journals as wheel carriers arranged at the ends thereof, and at least two trailing arms rigidly fixed to the axle beam, each half of the vehicle rigid axle—as viewed from the middle of the axle—comprising an axle tube section (1), a trailing arm section (10) and a wheel head section (40) arranged one after the other, and the wheel head section (40) comprising at least one axle journal (41) for carrying a wheel, the axle tube sections (1) and the trailing arm sections (10) being fabricated from a closed hollow profile at least along the axle center line (3) in the region of the common contact zones, the axle tube having an average wall thickness of less than the average wall thickness of the trailing arms section (10), the axle tube sections (1) being welded to the trailing arm sections (10), and the trailing arm sections (10) being welded to the wheel head sections (40), and the axle tube and the trailing arm sections (1 and 10) which are adjacent to one another being inserted into one an other in a centering fashion in the regions of the welds (7) so as to form centering overlaps (9), the lengths of the centering overlaps (9) being less than five times the average wall thickness of the axle tube sections (10).

2. A rigid vehicle axle according to claim 1, wherein the ends of the axle tube sections (1) or of the trailing arm sections (10) are stepped at least twice in the regions of the welds (7).

3. A rigid vehicle axle according to claim 2, wherein the non-stepped axle tube and trailing arm sections (1) or (10) each have a recess (5) in the region of their overlap (9).

4. A rigid vehicle axle according to claim 1, wherein the respective axle tube and trailing arm sections (1) and (10) are centered in the region of the overlap (9) by means of a clamping fit.

5. A rigid vehicle axle according to claim 1, wherein the maximum outer diameter of the axle tube sections (1) is greater than the maximum outer diameter of the trailing arm sections (10), these sections (1) and (10) extending along the axle center line (3).

6. A rigid vehicle axle according to claim 1, wherein the trailing arm sections (10) and the wheel head sections (40) have end faces (12 and 42) which have the same planar, paired surfaces and are oriented parallel to the longitudinal vertical vehicle center plane.

7. A rigid vehicle axle according to claim 1, wherein the adjacent end faces (12 and 42) of the trailing arm section (10) and of the wheel head section (40) are friction-welded to one another.

8. A rigid vehicle axle according to claim 1, wherein the individual trailing arm section (10) in the central area between the articulated bearing (50) and the center line (3) has a closed tubular profile having one of a square and a circular cross-section.

* * * * *